(12) United States Patent
Kakkori (10) Patent No.: US 9,509,891 B2
(45) Date of Patent: Nov. 29, 2016

(54) CONTROLLING FOCUS LENS ASSEMBLY

(71) Applicant: MICROSOFT TECHNOLOGY LICENSING, LLC, Redmond, WA (US)

(72) Inventor: Hannu Kakkori, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/519,597

(22) Filed: Oct. 21, 2014

(65) Prior Publication Data

US 2016/0112612 A1   Apr. 21, 2016

(51) Int. Cl.
*H04N 5/225* (2006.01)
*G02B 7/04* (2006.01)
*G02B 13/00* (2006.01)
*G03B 3/10* (2006.01)
*G03B 13/36* (2006.01)

(52) U.S. Cl.
CPC .............. *H04N 5/2254* (2013.01); *G02B 7/04* (2013.01); *G02B 13/001* (2013.01); *G03B 3/10* (2013.01); *G03B 13/36* (2013.01); *H04N 5/2253* (2013.01)

(58) Field of Classification Search
CPC .... H04N 5/2254; H04N 5/2253; G02B 7/04; G02B 13/001; G03B 3/10; G03B 13/36
See application file for complete search history.

(56) References Cited

U.S. PATENT DOCUMENTS

| | | |
|---|---|---|
| 7,292,270 B2 | 11/2007 | Higurashi et al. |
| 7,830,415 B2 | 11/2010 | Nakahara |
| 8,169,489 B2 | 5/2012 | Orimoto et al. |
| 8,295,694 B2 | 10/2012 | Sogoh et al. |
| 8,462,216 B2 | 6/2013 | Sato et al. |
| 8,482,621 B2 | 7/2013 | Nagata et al. |
| 8,577,214 B2 | 11/2013 | Wakamatsu |
| 2008/0296385 A1* | 12/2008 | Vinogradov ....... G06K 7/10811 235/462.22 |
| 2009/0202235 A1* | 8/2009 | Li .................... H04N 5/23212 396/125 |
| 2010/0074607 A1 | 3/2010 | Topliss et al. |
| 2012/0114320 A1 | 5/2012 | Ohtsubo et al. |
| 2013/0034345 A1 | 2/2013 | Miyahara |

FOREIGN PATENT DOCUMENTS

| | | |
|---|---|---|
| EP | 1821126 A1 | 8/2007 |
| EP | 2431780 A1 | 3/2012 |

OTHER PUBLICATIONS

"Vibration Reduction", Published on: Aug. 5, 2014 Available at: http://www.nikonusa.com/en/Learn-And-Explore/Article/ftlzi4s6/vibration-reduction.html.
Razligh, et al., "Image Blur Reduction for Cell-Phone Cameras via Adaptive Tonal Correction", In Proceedings of IEEE International Conference on Image Processing, Sep. 16, 2007, 4 pages.
"International Search Report & Written Opinion Issued in PCT Application No. PCT/US2015/056291", Mailed Date Jan. 18, 2016, 10 Pages.

* cited by examiner

*Primary Examiner* — Mekonnen Dagnew
(74) *Attorney, Agent, or Firm* — Judy Yee; Micky Minhas (57) ABSTRACT

A method for positioning a focus lens assembly, the focus lens assembly being movable along an optical axis relative to an image sensor, comprises: moving the focus lens assembly against a mechanical stop; and moving the focus lens assembly from the mechanical stop to a frame focus position for exposure of a frame.

20 Claims, 4 Drawing Sheets

CONTROLLING FOCUS LENS ASSEMBLY

BACKGROUND

Digital cameras often comprise elements enabling variable focus distances. Moreover, various mobile apparatuses, such as smartphones and tablet computers, may incorporate miniaturized digital camera modules by which the user may capture still pictures and/or videos. Also in such camera modules, the focus distance may be variable.

The variable focus distance may be implemented e.g. by means of a focus lens assembly in which one or more focus lenses are movable along an optical axis in relation to an image sensor, driven by means of an actuator. For exposure of a frame for still picture or video sequence, the focus lens assembly may be driven to a predetermined frame focus position to produce a focused image of an object on the image sensor.

With a movable focus lens assembly, the image quality of an exposed frame may depend on the stability of the focus lens assembly in relation to the image sensor during the exposure of the frame.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A mobile apparatus may comprise an image sensor, a focus lens assembly movable along an optical axis relative to the image sensor, a mechanical stop, an actuator coupled to the focus lens assembly to position it, a focus control unit configured to provide focus lens assembly positioning instructions, and a driver coupled to the focus control unit and to the actuator. The driver may be configured to receive the focus lens assembly positioning instructions and to supply an actuating input to the actuator to position the lens focus lens assembly according to the lens focus lens assembly positioning instructions. The frame may be e.g. a frame for a still picture, or one of a plurality of sequential frames for a video sequence.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although some of the present examples may be described and illustrated herein as being implemented in a smartphone or a mobile phone, these are only examples of a mobile apparatus and not a limitation. As those skilled in the art will appreciate, the present examples are suitable for application in a variety of different types of mobile apparatuses, for example, in tablet computers, game consoles or game controllers, etc. Some of the examples may also be applicable in specific camera devices.

Figure 1:
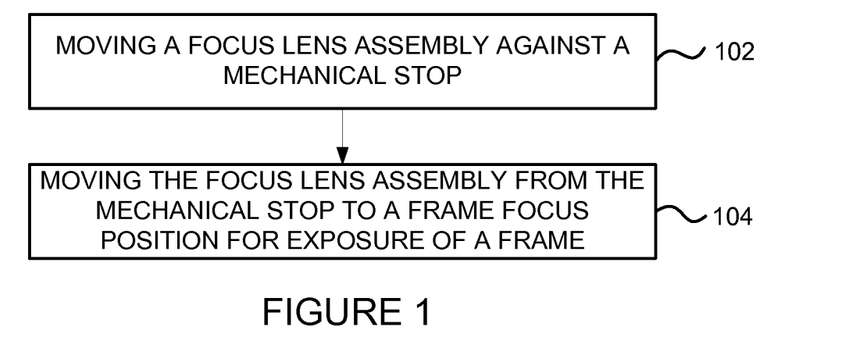
FIG. 1 is a flow chart of a method.

FIG. 1 shows a method which can be used to position a focus lens assembly which may be part of, or operating in connection with, a camera apparatus. Such camera apparatus may be a mobile electronic apparatus, such as e.g. a mobile phone, a smartphone, a tablet computer or a game console, incorporating a digital camera module or a digital imaging system inseparably integrated within the apparatus. On the other hand, a camera apparatus may also be a specific, stand-alone digital camera device, e.g. a compact camera, a SLR (Single-Lens Reflex) camera, or a mirrorless interchangeable-lens camera.

A focus lens assembly may comprise just one single lens or lens element. It may also comprise a plurality of lenses or lens elements. A movable focus lens assembly may also comprise, in addition to one or more lenses, any appropriate lens holder structure to which the one or more lenses or lens elements may be mounted and/or by which they may be supported, and via which the lens assembly may be connected to surrounding device structures and coupled to an actuator for positioning the focus lens assembly.

"Positioning" covers in this specification controlling a focus lens assembly both by moving it and keeping it, or simply letting it lie, at a particular position. The focus lens assembly is movable at least along an optical axis relative to an image sensor, e.g. a CMOS (Complementary Metal Oxide Semiconductor) image sensor or a CCD (Charge-Coupled Device).

By moving the focus lens assembly along an optical axis relative to an image sensor, the focus distance may be adjusted. Thereby, sharp images of objects at different distances from the focus lens assembly may be formed on the image sensor. By "focus distance" is meant in this specification the distance from a focus lens assembly to an object, at which distance a focused, sharp image of the object may be formed on the image sensor.

In the method of FIG. 1, the focus lens assembly is first moved against a mechanical stop, see step 102. The movement can be actuated e.g. by means of a voice coil motor (VCM) by supplying an appropriate current to a coil of the voice coil motor. In a voice coil motor, the supply current determines the position of the motor, and consequently also the position of a focus lens assembly coupled to the VCM. The position of the focus lens assembly against a mechanical stop may correspond to a particular current level. Alternatively, the position of the focus lens assembly against a mechanical stop may correspond to a rest state of the VCM with zero supply current.

Alternatives to a VCM actuator include e.g. stepper motors, piezoelectric actuators, and micro-electro-mechanical systems (MEMS).

Next, in step 103, the focus lens assembly is moved, possibly after a stabilizing period, from the mechanical stop to a frame focus position for exposure of a frame. Between moving the focus lens assembly against the mechanical stop, and moving it further from the mechanical stop to a frame focus position, the focus lens assembly may lie against the mechanical stop.

Same actuator which was used to move the focus lens assembly against the mechanical stop in step 102 may be used to move it to the frame focus position.

A mechanical stop above may refer to any appropriate structure mechanically limiting the movability of the focus lens assembly so that the focus lens assembly can be brought against the mechanical stop, i.e. into contact with it, whereby the mechanical stop prevents the focus lens assembly from moving further.

By a "frame" is meant in this specification a digital image captured via exposure of pixels of an image sensor. A frame may be used to produce one single still picture. A frame may also be one frame of a plurality of sequential frames for producing a sequence of images, e.g. for a video sequence. Alternatively, a frame may also be a temporary image captured during an autofocus (AF) control loop for searching an optimal focus position of the focus lens assembly before capturing the actual image(s).

In general, in this specification, a "frame focus position" refers to a position of a focus lens assembly along an optical axis, needed for exposure of a frame with a predetermined focus distance on the image sensor. The frame focus position may be determined e.g. by a focus control unit of a camera apparatus. So, after step 103, i.e. after moving the focus lens assembly to a frame focus position, the camera apparatus is ready for exposure of a frame.

Figure 2:
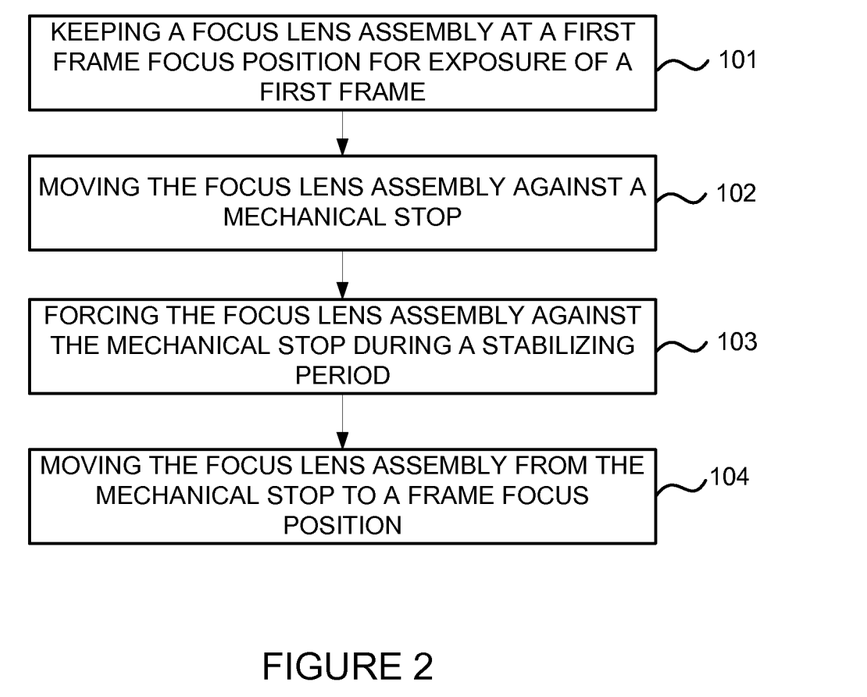
FIG. 2 is a flow chart of a method.

FIG. 2 illustrates a further way of implementation of a method for positioning a focus lens assembly. The method of FIG. 2 again comprises the steps 102, 104 of moving the focus lens assembly against a mechanical stop and from the mechanical stop to a frame focus position, here a second frame focus position, for exposure of a second frame. It also comprises a preceding step 101 of keeping the focus lens assembly at a first frame focus position for exposure of a first frame. In step 102, the focus lens assembly is moved from the first frame position against a mechanical stop. In step 104, the focus lens assembly is moved, after a stabilizing period, from the mechanical stop to a second frame focus position. So, the focus lens assembly is moved from the mechanical stop, i.e. from being contact with it, to the second frame focus position only after the stabilizing period.

In the method of FIG. 2, the focus lens assembly is not just passively let lie at the position against the mechanical stop during the stabilizing period. Instead, it is forced against the mechanical stop during the stabilizing period between the steps of moving the focus lens assembly against the mechanical stop, and moving it further to the second frame focus position. Corresponding forcing against the mechanical stop may be performed also in the example method of FIG. 1.

By "forcing against" a mechanical stop is meant in this specification generally providing a force pushing or pressing the focus lens assembly against the mechanical stop so that at least part or the focus lens assembly is in contact with the mechanical stop.

Forcing the focus lens assembly against a mechanical stop may be carried out by means of the same or a similar actuator as moving the focus lens assembly against the mechanical stop and from mechanical stop to a frame focus position for exposure of the next frame.

In the example methods of FIGS. 1 and 2, the stabilizing period may be e.g. 5 ms (millisecond) or more. In some applications, depending on the properties of the camera apparatus and the exposure procedure used, the stabilizing period may also be shorter. For example, it may be 1 to 5 ms.

Both of the methods of FIG. 1 and FIG. 2 may be used for exposure of a plurality of sequential frames of a video sequence, i.e. series of a plurality of images for generating a moving video image. For exposure of such sequence of frames, the focus lens assembly may be moved, and possibly forced, against a mechanical stop between exposures of each two sequential frames. Alternatively, the displacement of the focus lens assembly against the mechanical stop may be carried out with predetermined intervals. For example, the focus lens assembly may be moved against a mechanical stop after the exposure of every second, every third, or every fifth frame, and so on.

The camera apparatus, the focus lens assembly of which is positioned in the examples of FIGS. 1 and 2, may be configured to operate on the basis of global shutter exposure, wherein all pixels of an image sensor are exposed simultaneously. On the other hand, one or more specifically advantageous features may be achievable in connection of a camera, an imaging system, or a camera module configured to operate based on rolling shutter exposure. In rolling shutter exposure, the exposure and read-out of the image sensor pixels are carried out row by row, i.e. one pixel row, or column, at a time. Then, the different pixel rows, or columns, are exposed at slightly different time instants or at least during not completely overlapping exposure periods.

Advantageous results may be achieved by the example methods described above. For example, moving the focus lens assembly against a mechanical stop before the exposure of a frame, and moving the focus lens assembly to a frame focus position from the mechanical stop, may decrease vibrations of the focus lens assembly, thereby stabilizing it for the exposure.

Even more effective stabilization of the focus lens assembly may result from the additional forcing of the focus lens assembly against the mechanical stop during the stabilizing period.

Improved lens stability may improve the image quality. In rolling shutter exposure, particular improvement may result via constant focusing through the whole image area. This may result in a decrease of a so called focus wobble. By focus wobble is typically meant variation of the focus distance in different areas of a frame due to vibrations of a focus lens assembly relative to the image sensor during rolling shutter exposure. This effect may be present both in still pictures and in moving video images.

When moving the focus lens assembly against the mechanical stop, the speed of movement of the focus lens assembly may be reduced gradually when the focus lens assembly approaches the mechanical stop. In other words, the speed of movement may be lower close to the mechanical stop than farther from it. Lowering the speed may advantageously result in a gentle hit of the focus lens assembly on the mechanical stop, preventing the focus lens assembly from bouncing off the mechanical stop. A gentle hit may also reduce the sound the hit generates, which may be advantageous e.g. in video capture.

A mechanical stop against which the focus lens assembly is moved may lie on the side of the optical axis so that when moving the focus lens assembly against mechanical stop, it is moved sideways, out of the optical axis. However, the mechanical stop may advantageously lie so located in relation to the optical axis that the focus lens assembly may be moved against the mechanical stop, and therefrom, along the optical axis. Then, the movement of the focus lens assembly against and from the mechanical stop may be carried out by using a same actuator which performs the normal focusing, i.e. positioning of the focus lens assembly along the optical axis for exposure of a frame with a predetermined focus distance.

Figure 3:
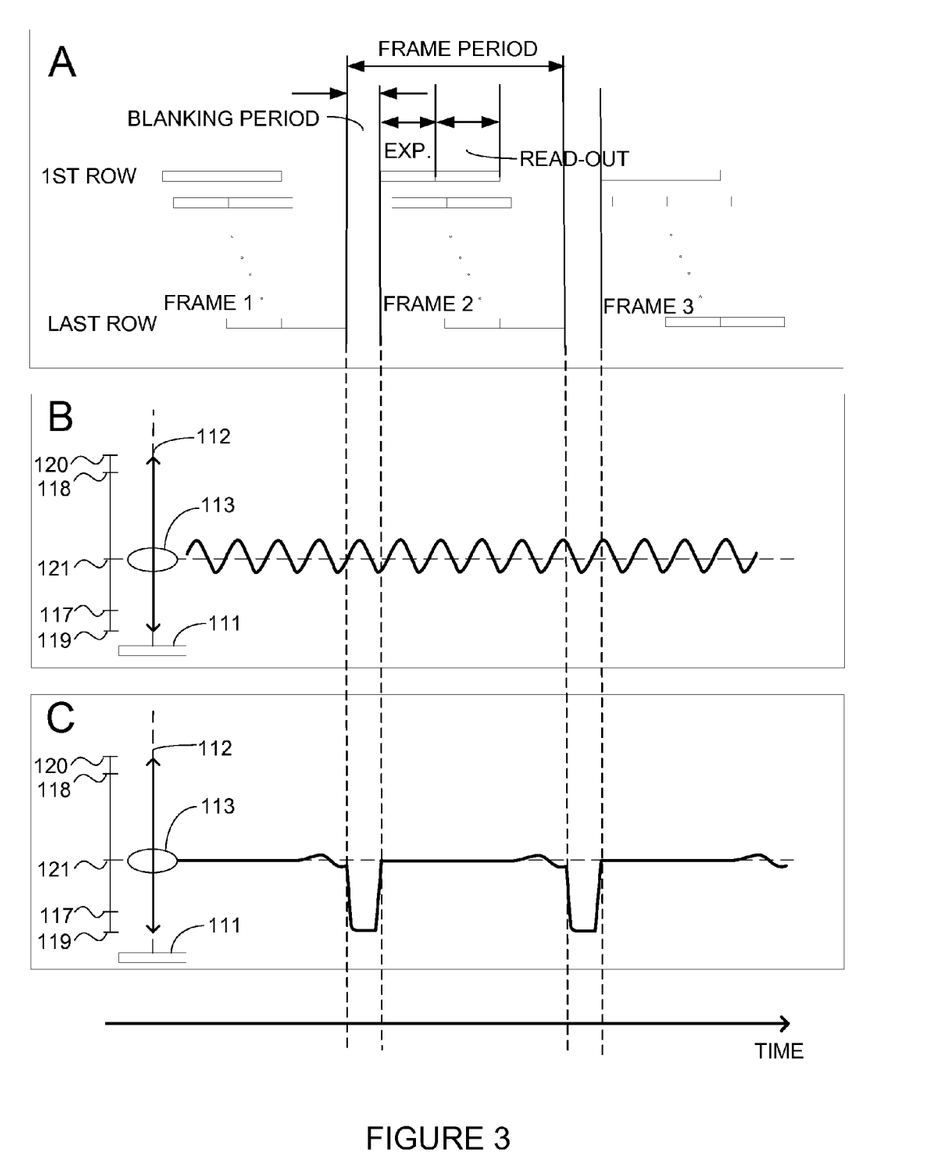
FIG. 3 illustrates the steps of a method.

FIG. 3 illustrates positioning of a focus lens assembly 113 in relation to an exposure procedure for exposing frames for a video sequence. The frames are exposed by focusing light through the focus lens assembly to a digital image sensor 111 having a plurality of pixels arranged in a plurality of pixel rows. In the graphs of FIG. 3, the horizontal direction indicates the propagation of time. In graph A, the vertical direction serves for separating the different pixel rows. In graphs B and C, the vertical direction indicates the location of the focus lens assembly, i.e. the position of it on an optical axis 112.

The uppermost graph A presents rolling shutter exposure procedure of the sequential frames. The exposure of a single frame starts by exposing a first pixel row. In graph A, this is the uppermost pixel row. In general, the first pixel row can also be the lowermost, or some intermediate pixel row. The exposure time depends on, for example, the lighting conditions and the properties of the image sensor and the optics used, including the focus lens assembly. The exposure time may be e.g. in the range of some milliseconds to a couple of tens of milliseconds.

After exposure of the pixels of the first row, the information of the light collected by the pixels thereof is read, i.e. collected from the pixels for image processing purposes. This phase is called read-out.

The exposure and read-out of the other pixel rows is performed in a similar manner sequentially so that the exposure of the next row is started a bit later than the exposure of the previous row. In the case of an intermediate pixel row as the first row, the exposure and read-out of the following pixel rows may be performed two pixel rows at a time, the procedure propagating simultaneously in two directions from the first pixel row.

In the exposure procedure illustrated in graph A, there is a fixed time period, a so called frame period, for the exposure and read-out of all pixel rows for one frame. The frame period may be e.g. 33.33 ms, corresponding to a frame rate of 30 frames per second. Naturally, any other appropriate frame rate and corresponding frame period may also be used.

A frame period starts from the end of the read-out of the last pixel row of a previous frame, and ends when the read-out of the last pixel row of the present frame is completed. Before the start of the exposure of the first pixel row, there is a blanking period during which no exposure or read-out takes place.

Graph B of FIG. 3 illustrates the position of a focus lens assembly 113 during the exposure procedure of graph A. The focus lens assembly, marked by one single lens element FIG. 3, is movable along the optical axis 112 relative to the image sensor 111. In practice, a focus lens assembly may comprise, for example, one or more lens elements and a lens holder to which the one or more lenses are mounted. In the drawings of FIG. 3, the movable range of the focus lens assembly is illustrated by an imaginary bar adjacent to the optical axis. Several specific positions are marked on this bar. The extreme positions of the focus lens assembly for use during exposure are an infinity focus position 117 and a close focus position 118 for an infinite focus distance and the closest possible focus distance, respectively. Outside the normal focus adjustment range between and including these two positions, there is an infinity end mechanical stop position 119 behind the infinity focus position, and a close end mechanical stop position 120 behind the close focus position. At each of these positions, the focus lens possibly is in contact with a mechanical stop (not shown).

For exposure of each frame, there is a predetermined frame focus position 121. In the example of FIG. 3, the frame focus position remains the same for each frame. Naturally, each frame could also have an own frame focus position different from the focus position of the previous and/or the next frame.

Graph B illustrates the position of the focus lens assembly which has been moved to and kept at the frame focus position for the exposure of the frames, in a case where an apparatus, in which the image sensor and the lens assembly are incorporated, vibrates with a frequency which is several times higher than the frame rate. Even though the focus lens assembly is actively kept at the frame focus position, e.g. by supplying a constant current to a VCM serving as an actuator for positioning the focus lens assembly, the focus lens assembly may vibrate relative to the image sensor 111. This may result in that the actual position of the focus lens assembly continuously fluctuates or oscillates around the frame focus position. This variation is illustrated in graph B by a sinusoidal-like curve superposed on a dashed line representing the frame focus position 121.

The varying position of the focus lens assembly results in varying focus distance during the exposure of a single frame. On the other hand, the focusing also varies between the exposures of different pixel rows. This may be seen as various undesired effects, such as image blur and focus wobble, deteriorating the image quality.

In the situation of graph C, the positioning may be performed generally according to the methods of FIGS. 1 and 2. The situation of graph C thus differs from that of graph B in that the focus lens assembly is not constantly kept at the frame focus position 121. Instead, after the read-out of the last pixel row for a previous frame, the focus lens assembly is driven, i.e. moved by means of an actuator, to the infinity end mechanical stop position 119 where it becomes into contact with a mechanical stop structure. Thereafter, it is again moved to the frame focus position before the exposure of the next frame begins.

As illustrated in graph C by a line representing the position of the focus lens assembly on the optical axis in function of time, the contact with the mechanical stop structure may effectively stop or at least dampen the vibrations of the focus lens assembly. When moved back to the frame focus position, the focus lens assembly may be therefore even essentially free of any vibration. Some vibration may start to generate again during the frame period. However, the vibration may build up so slowly that at the end of the frame period, the vibration is still much lower than in the case of constantly keeping the focus lens assembly in the frame focus position.

The period between moving the focus lens assembly to the infinity end mechanical stop position 119 and therefrom back to the frame focus position may be called as a stabilizing period, referring to the fact that the contact with the mechanical stop structure may stabilize the focus lens assembly via reduction of vibrations thereof. The length of the stabilizing period may vary. It may be advantageous to move the focus lens assembly back to the frame focus position as late as possible so that the moving may be still completed before the start of the exposure of the next frame. Thereby, it may be possible to avoid or at least reduce generation of new vibrations before the exposure of the next frame. In some applications, the stabilizing period may be e.g. 50% or more of the blanking period.

As illustrated in graph C, when moving the focus lens assembly 113 towards the infinity end mechanical stop position 119, the speed of the movement thereof is gradually reduced. This may help to achieve a soft and gentle hit of the focus lens assembly on the mechanical stop structure. Alternatively, or additionally, a similar effect might be achieved by means of a mechanical stop having a stopping block of a resilient material configured to damp the hit.

Instead of moving the focus lens assembly against the infinity end mechanical stop position, it could also be moved to the close end focus stop position. It may be useful to select that one of those two positions which is closer to the frame focus position for the previous or the next frame.

What is described above about the definitions, the details, the ways of implementation, and the advantageous effects of the methods apply, mutatis mutandis, to the device aspects discussed below. The same apply vice versa. The following apparatuses and imaging elements are examples of means for performing the methods described above. On the other hand, the previous methods are examples of possible ways of operation of the apparatuses and imaging elements described in the following.

Figure 4:
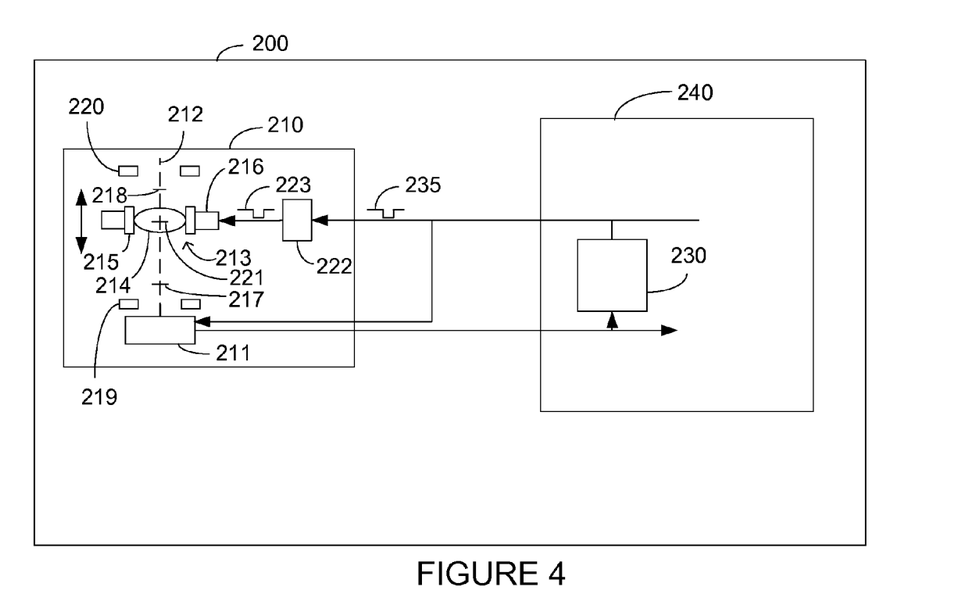
FIG. 4 is a block diagram of a mobile apparatus.

FIG. 4 shows, as a block diagram, a part of a mobile electronic apparatus 200.

The mobile electronic apparatus of FIG. 4 has a digital camera module 210 incorporated into the apparatus. The camera module comprises an image sensor 211, e.g. a CMOS sensor, serving as means for capturing a frame. At a distance from the image sensor, movable along an optical axis 212 relative to the image sensor, there is a focus lens assembly 213 comprising a lens element 214 mounted to and supported by a lens holder 215. A Voice Coil Motor (VCM) 216 as an actuator, serving as means for positioning the focus lens assembly, is coupled to the focus lens assembly to position it, i.e. to move the focus lens assembly along the optical axis, and to keep it in place at predetermined locations on the optical axis.

With different positions of the focus lens assembly, the focus distance of the camera module may be adjusted within a focus adjustment range. Maximum focus distance of infinite length is achieved with the focus lens assembly at an infinity focus position 217. The shortest focus distance is achieved with the focus lens assembly at a closest focus position 218. This can also be called a macro focus position, if the camera module can be operated in a specific macro imaging mode.

The optical axis 212 is not any physical structure but an imaginary line in free space, defining the path along which the light rays propagate from the objects to be imaged through the focus lens assembly to the image sensor.

The camera module 210 further comprises two mechanical stops 219, 220 extending around the optical axis, one located close to the image sensor and being an infinity end mechanical stop 219, and the other located farther away from the image sensor and being a close end mechanical stop 220. The mechanical stops lie outside the normal operating range of the focus lens assembly used for exposure of frames, so that each of the infinity and the closest focus positions of the focus lens assembly lie at a distance from the corresponding mechanical stop.

Each of the mechanical stops is formed as a substantially rigid structure supported to a body of the camera module or the apparatus (the bodies not shown). A mechanical structure may be formed, for example, as an annular structure with an opening around the optical axis. A mechanical stop may be also formed as a simple square or rectangular plate with corresponding opening, through which the optical axis goes. It is however not necessary to have a mechanical structure forming a continuous circumference surrounding the optical axis. Instead, a mechanical stop may also comprise, for example, one or more separate bars or protrusions at a distance from the optical axis. It may be advantageous to have a mechanical stop so firmly supported by the body of the camera of the apparatus, and have the stop itself so rigid, that the mechanical stop cannot move or substantially vibrate in relation to that body during the normal operation conditions of the apparatus.

Each of the mechanical stops 219, 220 may comprise a stopping block, e.g. in the form of a bump or a surface layer located at the side of the focus lens assembly and formed of a resilient material. Such stopping block may dampen the hit of the focus lens assembly against the mechanical stop.

The Voice Coil Motor (VCM) 216 may be formed as a cylindrical assembly surrounding the optical axis. The VCM may comprise a first part (not illustrated separately) mounted on the body or a support plate (not shown) of the camera module, and a second part (not illustrated separately) movable with respect to the first part. The focus lens assembly may be mounted, e.g. via the lens holder, to the second part of the VCM. The first part of the VCM may have a winding coil, and the second part may have permanent magnet elements. In such configuration, the winding coil and the permanent magnet elements may be arranged so that when an actuating input in the form of an electric current is supplied to the winding coil, the magnetic fields generated by the current flowing through the coil and that generated by the permanent magnets interact so that for each current, a balance of forces exist for specific mutual locations of the first and the second part of the VCM. Thereby, the focus lens assembly can be positioned by controlling the current supplied to the winding coil.

When a constant current is supplied, the focus lens assembly lies at a constant position. Without any supply current, the VCM returns to a rest state where the relative positions of the first and the second part, and thereby also the position of the focus lens assembly relative to the image sensor, is determined by the mechanical configuration of the VCM.

The VCM can be configured to have its rest state at one end of the focus adjustment range, i.e. at the infinite focus position 217 or at the closest focus position 218, or against the corresponding mechanical stop 219, 220. The VCM may also be configured to operate two-directionally so that the rest state lies at an intermediate location between the infinite focus position 217 and the closest focus position 218, from which the movable part together with the focus lens assembly may be moved to both directions.

Instead of a VCM, an actuator for positioning the focus lens assembly could also comprise e.g. a stepper motor, a piezoelectric actuator, or a micro-electro-mechanical system (MEMS).

Outside the camera module 210, the mobile apparatus of FIG. 4 comprises a focus control unit 230 serving as means for providing focus lens assembly positioning instructions. The focus control unit is thus configured to provide focus lens assembly positioning instructions 235, i.e. instructions for positioning the focus lens assembly on the optical axis. Those focus lens assembly positioning instructions may be generated and supplied from the focus control unit in any appropriate signal form suitable for use in mobile electronic apparatuses. Suitable connection interfaces for supplying the focus lens assembly positioning instructions are, for example, I$^2$C (Inter-Integrated Circuit) and SPI (Serial Peripheral Interface). Correspondingly, electrical signal forms determined for those connection interfaces may be used.

In the example of FIG. 4, the focus control unit is part of a larger image processing module 240.

The camera module 210 further comprises a driver 222 which is coupled to the focus control unit 230 and to the actuator 216. The driver serves as means for receiving the focus lens assembly positioning instructions and for supplying an actuating input to the means for positioning the focus lens assembly. For this purpose, the driver is configured to receive the focus lens assembly positioning instructions 235 and to supply an actuating input 223 to the actuator to position the lens focus lens assembly according to the focus lens assembly positioning instructions. So, the driver converts the initial focus lens assembly positioning instructions to an actuating input actually causing the actuator to operate and thus position the focus lens assembly.

The form of the actuating input may vary according to the type of the actuator 216. In the example of FIG. 4, with a VCM as the actuator, the actuating input may be in the form of an actuating electrical current signal. In the case of some voltage-driven actuator, the actuating input could be correspondingly a voltage signal. The driver may comprise e.g. a Digital-to-Analog Converter (DAC) to convert digital focus lens assembly positioning instructions to an analog voltage or current level suitable for the actuator.

The electronic mobile apparatus 200 of FIG. 3 may be e.g. a smartphone. Alternatively, an electronic mobile apparatus may be e.g. a mobile phone, a tablet computer, a portable game console or game controller, or any other mobile electronic apparatus or device including digital camera means. An electronic mobile apparatus may also be a specific camera device, e.g. an action camera for use e.g. as being mounted onto a helmet or a vehicle, or a wearable camera. A specific camera apparatus may be even a general-purpose compact camera, an SLR camera, or a mirrorless interchangeable-lens camera. The apparatus or device may incorporate digital camera means as a separate camera module, as illustrated in FIG. 4, or camera means may also be formed as an inseparable, integrated part of the device or apparatus.

Next, the operation of the camera module 210 and the relevant parts of the mobile electronic apparatus 200 for exposing frames with desired focusing is discussed.

Before exposing an actual frame for a still picture or a video sequence, the image processing module 240 and the camera module 210 first operate together to determine an appropriate focusing. This may be based on various autofocus (AF) algorithms. An AF algorithm may be performed e.g. in a loop where focusing frames are exposed with various focus distances. For example, the entire focus adjustment range can be scanned through with predetermined intervals.

For such scanning the focus adjustment range, the focus control unit 230 determines each focus distance of the AF algorithm, and generates focus lens assembly positioning instructions 235 accordingly. The driver 222 receives these instructions and actuates the VCM accordingly by supplying actuating inputs 223 to it. The image processing module 240 receives each focusing frame thereby captured, and processes the plurality of focusing frames to determine the optimal focus distance for the exposure of the actual frame (s). This determination can be based e.g. on a contrast detection AF algorithm. Any other AF algorithm may also be used.

When the optimal focus distance has been determined, the focus control unit 230 generates focus lens assembly positioning instructions to be used for the exposure of the next actual frame. The driver receives these instructions and supplies an actuating input to the actuator correspondingly.

Alternative to an AF algorithm for automatically determining appropriate focusing, the focus distance may also be determined manually by the user of the apparatus, via the user interface of the apparatus. Then, the focus control unit 230 just generates focus lens assembly positioning instructions according to the selected focus distance.

The image processing module 240 also controls the operation of the image sensor 211, as indicated in FIG. 4 by an arrow coupling the image processing module and the image sensor together.

For exposure of a particular frame, the focus lens assembly positioning instructions 235 comprise instructions to first move the focus lens assembly against one of the mechanical stops 219, 220, and from the mechanical stop to a frame focus position 221 for exposure of the frame. Thus, instead of moving the focus lens assembly directly to a frame focus position for exposure, it is first instructed to be moved against, i.e. into contact with, one of the mechanical stops. Thus, the focus lens assembly positioning instructions 235 then comprise instructions corresponding to the steps 102 and 104 of FIG. 1. This may provide the advantageous effects discussed above in relation to the method aspect.

When the focus lens assembly positioning instructions comprise instructions to move the focus lens assembly against a mechanical stop, the actuating input supplied by the driver then respectively comprises an actuating input to move the focus lens assembly against the mechanical stop.

The instructions to move the focus lens assembly from the mechanical stop to a frame focus position may comprise instructions to move the focus lens assembly to the frame focus position only after a stabilizing period. The stabilizing period may be e.g. at least 5 ms. On the other hand, it may also be shorter, e.g. 1 to 5 ms in some applications.

When the focus lens assembly positioning instructions comprise instructions to move the focus lens assembly to the frame focus position only after a stabilizing period, the actuating input supplied by the driver then respectively comprises an actuating input to move the focus lens assembly to the frame focus position only after a stabilizing period.

When the focus lens assembly positioning instructions comprise instructions to move the focus lens assembly from the mechanical stop to a second frame focus position only after a stabilizing period, they may advantageously also comprise instructions to force the focus lens assembly against the mechanical stop during the stabilizing period, corresponding to step 103 of the method of FIG. 2.

The one of the mechanical stops against which the focus lens assembly is instructed to be moved may be the one which is located closer to the frame focus position 221. This may enable maximum duration of the stabilization period, which may further improve the image quality.

Figure 5:
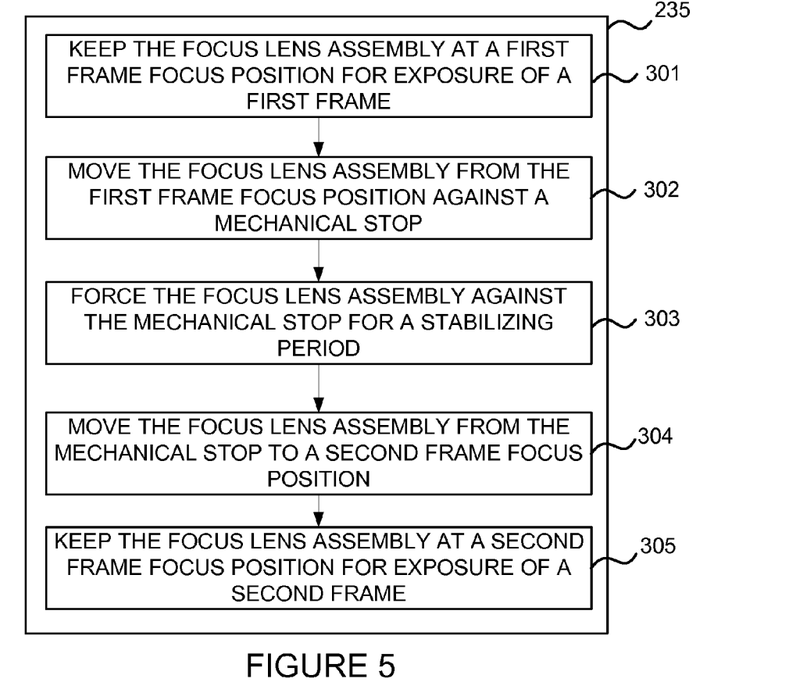
FIG. 5 illustrates an example of the operation a mobile apparatus.

FIG. 5 illustrates another example of the focus lens assembly positioning instructions 235 which the focus control unit of FIG. 4, or a focus control unit in general, may generate. The flow chart of FIG. 5 comprise instructions first to keep the focus lens assembly at a first frame focus position for exposure of a first frame in step 301, then to move the focus lens assembly from the first frame focus position against a mechanical stop in step 302. Next, the instructions comprise instruction to force the focus lens assembly against the mechanical stop for a stabilizing period in step 303, and thereafter move the focus lens assembly from the mechanical stop to a second frame focus position in step 304. In step 305, the focus lens assembly is instructed to be actively kept at a second frame position for exposure of a second frame. The first and the second frame focus positions may be the same. Alternatively, the focusing may be changed between the first and the second frame so that the first and the second frame focus positions are different. Positioning of the focus lens assembly according to these instructions may be used for exposure of two sequential frames, e.g. two sequential frames of a video sequence.

For video capture, the focus lens assembly positioning instructions may comprise instructions to move the focus lens assembly against one of the mechanical stops between exposures of each two sequential frames.

Referring to FIG. 3, in the case of video capture, there may be a blanking period between the exposure and read-out of the first and the second frames. Then, the stabilizing period may be e.g. at least 50% of the blanking period. In some applications, the step 303 may be omitted, wherein the focus lens simply may lie freely against the mechanical stop.

In one alternative approach, the exposure and read-out of one specific frame may be omitted, whereby the focus lens assembly may be moved against a mechanical stop during the freed time period between the exposure and read-out of the previous and the next frame. This approach may be utilized e.g. in a case where there is no blanking period between each two sequential frames, or where the blanking period is too short for enabling such movement of the focus lens assembly during the blanking period.

The actuating input may be so configured that when moving the focus lens assembly against a mechanical stop, the speed of the movement thereof is gradually reduced when the focus lens assembly approaches the mechanical stop.

The image processing unit 240 of FIG. 4 may comprise e.g. at least one processor and at least one memory coupled to the processor. The at least one memory may store program code instructions which, when run on the at least one processor, cause the processor to perform various image processing operations, including those of the focus control unit discussed above. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As an alternative to the configuration of FIG. 4, the elements of a mobile electronic apparatus might be arranged differently. For example, the driver 222 and the image sensor 211 might be arranged on a same substrate or even on a same chip in the camera module. The driver 222 might also be incorporated in the image processing module, and also share a common substrate, e.g. a common printed circuit board, with the focus control unit 230. In general, any of the driver, the focus control unit, the image processing module, and the image sensor may be combined to one or more of the other ones of those elements to form one single component, element, or module.

Figure 6:
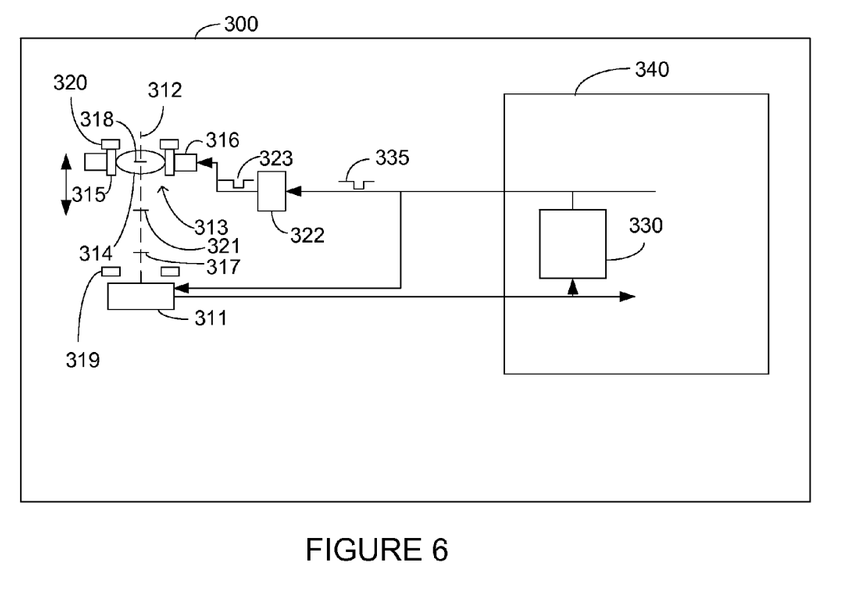
FIG. 6 is a block diagram of a mobile apparatus.

FIG. 6 shows a mobile electronic apparatus 300 which comprises the same structural and functional features, and performs the same operations as the apparatus 200 of FIG. 4. The elements of the apparatus are however arranged differently. There is no specific camera module separate from the rest of the apparatus. Instead, an image sensor 311, a focus lens assembly 313 comprising a focus lens element 314 and a lens holder 315 and being movable along an optical axis 312, an actuator 316, two mechanical stops 319, 320, an image processing module 340 with a focus control unit 330, and a driver 322 coupled to the actuator and to the focus control unit are all integrated into a single integrated assembly. Similarly to the apparatus 200 of FIG. 4, the focus control unit 330 determines the frame focus position 321 for each frame, and generates focus lens assembly positioning instructions 335 accordingly. The driver 322 receives these instructions and actuates the actuator 316 accordingly by supplying actuating inputs 323 to it.

FIG. 6 illustrates the apparatus on a state where the focus lens assembly has been driven, i.e. moved, against the close end mechanical stop 320 so that the lens holder 315 has come into contact with the mechanical stop.

The apparatus 300 of FIG. 6 may be, for example, a specific camera device, e.g. compact camera, an action camera, or a wearable camera. However, an integrated configuration such as that of FIG. 6 may also be used in apparatuses which are not specific camera devices, such as smartphones, mobile phones, tablet computers, game controllers, etc.

As a possible modification to the apparatus 300 of FIG. 6, the image processing module 340 together with the focus control unit 330 could be combined with the driver 322, and possibly even also with the image sensor 311 to form one single module. For example, an image processing module, a driver, and an image sensor might be comprised in a single system-on-a-chip (SoC).

Figure 7:
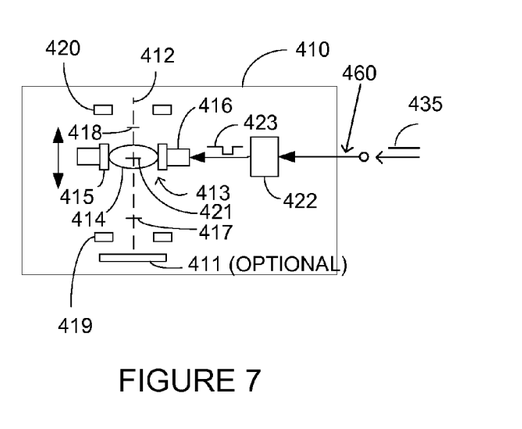
FIG. 7 is a block diagram of an imaging element.

FIG. 7 shows a block diagram of an imaging element 410 comprising a focus lens assembly 413 movable along an optical axis 412 and having a focus lens element 414 and a lens holder 415, an actuator 416, two mechanical stops 419, 420, and a driver 422 coupled to the actuator. The actuator and the driver serve as means for the same purposes as those of the apparatus 200 of FIG. 4. For exposure of frames for still pictures or video image, the focus lens assembly may be moved to any frame focus position 421 between and including an infinity focus position 417 and a close focus position 418. The imaging element further comprises a connecting arrangement 460 via which the driver may receive focus lens assembly positioning instructions 435 from the outside of the imaging element, e.g. from an imaging processing element of an apparatus to which the imaging element is incorporated. Thus, the connecting arrangement is an example of means for receiving focus lens assembly positioning instructions 435 from the outside of the imaging element.

The connecting arrangement 460 may comprise any appropriate connectors, wirings, and lines suitable for connecting the imaging element to an element providing the focus lens assembly positioning instructions. For example, for enabling connecting of the imaging element to an imaging processing unit of a smartphone, the connecting arrangement may comprise an $I^2C$ bus and corresponding interface connector.

The features and operations of the focus lens assembly, the actuator, the mechanical stop, and the driver may be the same as those of the corresponding members of the apparatus 200 of FIG. 4. As a difference in comparison to the apparatus 200, the driver 422 not only to receives the focus lens assembly positioning instructions 435 and converts them directly into an actuating 423 input for the actuator. Instead, the driver receives focus lens assembly positioning instructions and supplies an actuating input to the actuator to move the focus lens assembly against the mechanical stop, and from the mechanical stop to a frame focus position, defined by the focus lens assembly positioning instructions, for exposure of a frame.

Thus, the driver 422 may receive focus lens assembly positioning instructions comprising just information on the required frame focus position(s). The driver itself then serves for adding into the actuating input the movement of the focus lens assembly, before moving it to a frame focus position, against a mechanical stop, and only from the mechanical stop to a frame focus position, possibly after a stabilizing period. Similarly to the other examples discussed above, when exposing two or more sequential video frames, e.g. of a video sequence, the focus lens assembly may be moved against one of the two mechanical steps between the exposures of each two sequential frames.

The actuating input 423 may also be generated so as to actuate the actuator to force the focus lens assembly against a mechanical stop for a stabilizing period, before moving it from the mechanical stops to the frame focus position for the exposure of the next frame.

The imaging element 410 may further comprise, as means for capturing an image, a digital image sensor 411, e.g. a CMOS sensor, which may be operate on a rolling shutter basis. With an image sensor, an imaging element may be formed e.g. as a camera module suitable for being incorporated in a mobile electronic apparatus, such as a mobile phone, a smartphone, a tablet computer, or any other mobile electronic apparatus incorporating a digital camera.

As another example, the imaging element 410 may be formed as an interchangeable lens, i.e. an "objective" or an "objective lens", for a digital camera.

To perform the addition of the movement of the focus lens assembly against a mechanical stop before moving it to a frame focus position, the driver may comprise some further functional element(s) in comparison to the drivers 222, 322 of the examples of FIGS. 4 and 6. For example, the driver may comprise e.g. at least a processor and a memory coupled to the processor. The memory may store program code instructions which, when run on the processor, cause the processor to perform said addition of the movement of the focus lens assembly against a mechanical stop into the actuating input. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the apparatus and imaging element examples above, the means for providing focus lens assembly positioning instructions, and the means for receiving the focus lens assembly positioning instructions and for supplying an actuating input to the means for positioning the focus lens assembly may be considered generally as means for providing an actuating input for positioning the focus lens assembly.

The apparatus and imaging element examples discussed above share some common features. These features may be considered as imaging means. Such imaging means may comprise a focus lens assembly movable along an optical axis, a mechanical stop, means for positioning the focus lens assembly, and means for providing an actuating input for positioning the focus lens assembly. The means for positioning the focus lens assembly may comprise an actuator coupled to the focus lens assembly.

In a mobile apparatus aspect, the means for providing an actuating input for positioning the focus lens assembly may comprise means for providing focus lens assembly positioning instructions, and means for receiving the focus lens assembly positioning instructions and for supplying an actuating input to the actuator to position the focus lens assembly according to the focus lens assembly positioning instructions, wherein the focus lens assembly positioning instructions comprise instructions to move the focus lens assembly against the mechanical stop, and from the mechanical stop to a frame focus position for exposure of a frame.

In an imaging element aspect, the means for providing an actuating input for positioning the focus lens assembly may comprises means for receiving focus lens assembly positioning instructions and for supplying an actuating input to the actuator to move the focus lens assembly against the mechanical stop, and from the mechanical stop to a frame focus position, the frame focus position being defined by the focus lens assembly positioning instructions, for exposure of a frame.

Some embodiments are further discussed shortly in the following.

In a method aspect, a method for positioning a focus lens assembly, the focus lens assembly being movable along an optical axis relative to an image sensor, comprises: moving the focus lens assembly against a mechanical stop; and moving the focus lens assembly from the mechanical stop to a frame focus position for exposure of a frame.

In an embodiment, the focus lens assembly is moved from the mechanical stop to the frame focus position after a stabilizing period.

In an embodiment, the method is for being used for exposure of two sequential frames, wherein the focus lens assembly is moved against the mechanical stop from a first frame focus position for exposure of a first frame, and from the mechanical stop to a second frame focus position for exposure of a second frame.

In an embodiment, the method is for being used for exposure of a plurality of sequential frames of a video sequence, wherein the focus lens assembly is moved against the mechanical stop between exposures of each two sequential frames.

In an embodiment, the method comprises forcing the focus lens assembly against the mechanical stop during the stabilizing period.

In an embodiment, when moving the focus lens assembly against the mechanical stop, the speed of the movement of the focus lens assembly is reduced gradually when the focus lens assembly approaches the mechanical stop.

In an embodiment, the focus lens assembly is moved to a mechanical stop along the optical axis.

In an apparatus aspect, a mobile apparatus comprises: an image sensor; a focus lens assembly movable along an optical axis relative to the image sensor; a mechanical stop; an actuator coupled to the focus lens assembly to position it; a focus control unit configured to provide focus lens assembly positioning instructions; and a driver coupled to the focus control unit and to the actuator, and configured to receive the focus lens assembly positioning instructions and to supply an actuating input to the actuator to position the lens focus lens assembly according to the focus lens assembly positioning instructions. The focus lens assembly positioning instructions comprise instructions to move the focus lens assembly against the mechanical stop, and from the mechanical stop to a frame focus position for exposure of a frame.

In an embodiment, the focus lens assembly positioning instructions comprise instructions to move the focus lens assembly from the mechanical stop to the frame focus position for exposure of a frame after a stabilizing period.

In an embodiment, the stabilizing period is at least 5 ms. In another embodiment, it may be shorter, e.g. 1 to 5 ms.

In an embodiment, the focus lens assembly positioning instructions comprise instructions to: keep the focus lens assembly at a first frame focus position for exposure of a first frame; move the focus lens assembly from the first frame focus position against the mechanical stop; and move the focus lens assembly from the mechanical stop to a second frame focus position, and keep the focus lens assembly at the second frame position for exposure of a second frame.

In an embodiment, the first and the second frames are sequential frames of a video sequence.

In an embodiment, there is a blanking period between the exposure and read-out of the first and the second frames, wherein the focus lens assembly positioning instructions comprise instructions to move the focus lens assembly from the mechanical stop to the second frame focus position after a stabilizing period, and wherein the stabilizing period is at least 50% of the blanking period.

In an embodiment, the focus lens assembly instructions comprise instructions to force the focus lens assembly against the mechanical stop during the stabilizing period.

In an embodiment, the mechanical stop comprises a stopping block of a resilient material configured to damp the hit of the focus lens assembly against the mechanical stop.

In an imaging element aspect, an imaging element comprises: a focus lens assembly movable along an optical axis; a mechanical stop; an actuator coupled to the focus lens assembly to position it; and a driver coupled to the actuator, and configured to receive focus lens assembly positioning instructions and to supply an actuating input to the actuator to move the focus lens assembly against the mechanical stop, and from the mechanical stop to a frame focus position, defined by the focus lens assembly positioning instructions, for exposure of a frame.

In an embodiment of the imaging element, the actuating input is an actuating input to move the focus lens assembly from the mechanical stop to the frame focus position after a stabilizing period.

In an embodiment, the imaging element further comprises a digital image sensor.

In one embodiment where the imaging element comprises a digital image sensor, the imaging element is formed as a digital camera module.

In an embodiment, the imaging element is formed as an interchangeable lens for a digital camera.

In the following, further aspects of certain embodiments are discussed.

A method for positioning a focus lens assembly, the focus lens assembly being movable along an optical axis relative to an image sensor, comprises: moving the focus lens assembly against a mechanical stop; and moving the focus lens assembly from the mechanical stop to a frame focus position for exposure of a frame.

In an embodiment, the focus lens assembly is moved from the mechanical stop to a frame focus position after a stabilizing period.

In an embodiment as any of those two defined above, the method is used for exposure of two sequential frames, wherein the focus lens assembly is moved against the mechanical stop from a first frame focus position for exposure of a first frame, and from the mechanical stop to a second frame focus position for exposure of a second frame.

In an embodiment as any of those three defined above, the method is used for exposure of a plurality of sequential frames of a video sequence, wherein the focus lens assembly is moved against the mechanical stop between exposures of each two sequential frames.

In an embodiment with the stabilizing period, the method comprises forcing the focus lens assembly against the mechanical stop during the stabilizing period.

In an embodiment, which may be applicable in connection with any of the method embodiments above, when moving the focus lens assembly against the mechanical stop, the speed of the movement of the focus lens assembly is reduced gradually when the focus lens assembly approaches the mechanical stop.

In an embodiment which may be applicable in connection with any of the method embodiments above, the focus lens assembly is moved to a mechanical stop along the optical axis.

In another aspect, imaging means comprise: a focus lens assembly movable along an optical axis, a mechanical stop, means for positioning the focus lens assembly, means for providing an actuating input for positioning the focus lens assembly, wherein the actuating input comprises an actuating input to move the focus lens assembly against the mechanical stop, and from the mechanical stop to a frame focus position for exposure of a frame.

In an embodiment of the imaging means, the actuating input comprises an actuating input to move the focus lens assembly from the mechanical stop to the frame focus position for exposure of a frame after a stabilizing period.

In an embodiment with the stabilizing period, the actuating input comprises an actuating input to force the focus lens assembly against the mechanical stop during the stabilizing period.

In an embodiment, a mobile apparatus comprises imaging means as any of those ones defined above, and an image sensor relative to which the focus lens assembly is movable. In this embodiment, the means for providing an actuating input for positioning the focus lens assembly comprise: means for providing focus lens assembly positioning instructions, and means for receiving the focus lens assembly positioning instructions and for supplying an actuating input to the means for positioning the focus lens assembly according to the focus lens assembly positioning instructions, wherein the focus lens assembly positioning instructions comprise instructions to move the focus lens assembly against the mechanical stop, and from the mechanical stop to a frame focus position for exposure of a frame.

In an embodiment of the apparatus, the focus lens assembly positioning instructions comprise instructions to: keep the focus lens assembly at a first frame focus position for exposure of a first frame; move the focus lens assembly from the first frame focus position against the mechanical stop; and move the focus lens assembly from the mechanical stop to a second frame focus position, and keep the focus lens assembly at the second frame position for exposure of a second frame.

In an embodiment, the first and the second frames are sequential frames of a video sequence.

In an embodiment as any of those two ones with the first and the second frames, there is a blanking period between the exposure and read-out of the first and the second frames, wherein the focus lens assembly positioning instructions comprise instructions to move the focus lens assembly from the mechanical stop to a second frame focus position after a stabilizing period, and wherein the stabilizing period is at least 50% of the blanking period.

In an embodiment as any of those apparatus embodiments above, the mechanical stop comprises a stopping block of a resilient material configured to damp the hit of the focus lens assembly against the mechanical stop.

In an embodiment, an imaging element comprises imaging means as any of those ones defined above. In this embodiment, the means for providing an actuating input for positioning the focus lens assembly comprise means for receiving focus lens assembly positioning instructions and for supplying an actuating input to the means for positioning the focus lens assembly to move the focus lens assembly against the mechanical stop, and from the mechanical stop to a frame focus position, defined by the focus lens assembly positioning instructions, for exposure of a frame.

In an embodiment, the imaging element further comprises a digital image sensor.

In an embodiment, the imaging element comprising a digital image sensor, e.g. a CMOS sensor, is formed as a digital camera module.

In another embodiment, the imaging element is formed as an interchangeable lens for a digital camera.

The term "comprising" is used in this specification to mean including the features followed thereafter, without excluding the presence of one or more additional features.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The invention claimed is:

1. A method for positioning a focus lens assembly, the focus lens assembly being movable along an optical axis relative to an image sensor, the method comprising:
   moving the focus lens assembly against a mechanical stop; and
   moving the focus lens assembly from the mechanical stop to a frame focus position for exposure of a frame, the frame focus position being located within a range of positions that enable the focus lens assembly to achieve an exposure of frames, the mechanical stop being located at a position outside of the range of positions.

2. A method as defined in claim 1, wherein the focus lens assembly is moved from the mechanical stop to the frame focus position after a stabilizing period.

3. A method as defined in claim 2, wherein the method comprises forcing the focus lens assembly against the mechanical stop during the stabilizing period.

4. A method as defined in claim 1 used for exposure of two sequential frames, wherein the focus lens assembly is moved against the mechanical stop from a first frame focus position for exposure of a first frame, and from the mechanical stop to a second frame focus position for exposure of a second frame.

5. A method as defined in claim 1 used for exposure of a plurality of sequential frames of a video sequence, wherein the focus lens assembly is moved against the mechanical stop between exposures of each two sequential frames.

6. A method as defined in claim 1, wherein when moving the focus lens assembly against the mechanical stop, a speed of the movement of the focus lens assembly is reduced gradually when the focus lens assembly approaches the mechanical stop.

7. A method as defined in claim 1, wherein the focus lens assembly is moved to a mechanical stop along the optical axis.

8. A mobile apparatus comprising:
   an image sensor,
   a focus lens assembly movable along an optical axis relative to the image sensor,
   a mechanical stop,
   an actuator coupled to the focus lens assembly to position it,
   a focus control unit configured to provide focus lens assembly positioning instructions,
   a driver coupled to the focus control unit and to the actuator, and configured to:
      receive the focus lens assembly positioning instructions and
      supply an actuating input to the actuator to position the focus lens assembly according to the focus lens assembly positioning instructions,
   wherein the focus lens assembly positioning instructions comprise instructions to move the focus lens assembly against the mechanical stop, and from the mechanical stop to a frame focus position for exposure of a frame, the frame focus position being located within a range of positions that enable the focus lens assembly to achieve an exposure of frames, the mechanical stop being located at a position outside of the range of positions.

9. A mobile apparatus as defined in claim 8, wherein the focus lens assembly positioning instructions comprise instructions to move the focus lens assembly from the mechanical stop to the frame focus position for exposure of the frame after a stabilizing period.

10. A mobile apparatus as defined in claim 9, wherein the mechanical stop is a physical structure along the optical axis.

11. A mobile apparatus as defined in claim 9, wherein the focus lens assembly instructions comprise instructions to force the focus lens assembly against the mechanical stop during the stabilizing period.

12. A mobile apparatus as defined in claim 8, wherein the focus lens assembly positioning instructions comprise instructions to:
   keep the focus lens assembly at a first frame focus position for exposure of a first frame;
   move the focus lens assembly from the first frame focus position against the mechanical stop; and
   move the focus lens assembly from the mechanical stop to a second frame focus position, and keep the focus lens assembly at the second frame position for exposure of a second frame.

13. A mobile apparatus as defined in claim 12, wherein the first and the second frame are sequential frames of a video sequence.

14. A mobile apparatus as defined in claim 12, wherein a blanking period exists between an exposure and a read-out of the first and the second frames, wherein the focus lens assembly positioning instructions comprise instructions to move the focus lens assembly from the mechanical stop to the second frame focus position after a stabilizing period, and wherein the stabilizing period is at least 50% of the blanking period.

15. A mobile apparatus as defined in claim 8, wherein the mechanical stop comprises a stopping block of a resilient material configured to damp a hit of the focus lens assembly against the mechanical stop.

16. An imaging element comprising:
a focus lens assembly movable along an optical axis,
a mechanical stop,
an actuator coupled to the focus lens assembly, and
a driver coupled to the actuator, the driver configured to:
  receive focus lens assembly positioning instructions; and
  supply an actuating input to the actuator to move the focus lens assembly against the mechanical stop, and from the mechanical stop to a frame focus position defined by the focus lens assembly positioning instructions for an exposure of a frame, the frame focus position being located within a range of positions that enable the focus lens assembly to achieve an exposure of frames, the mechanical stop being located at a position outside of the range of positions.

17. An imaging element as defined in claim 16, wherein the actuating input is an actuating input to move the focus lens assembly from the mechanical stop to the frame focus position after a stabilizing period.

18. An imaging element as defined in claim 16, further comprising a digital image sensor.

19. An imaging element as defined in claim 18, formed as a digital camera module.

20. An imaging element as defined in claim 16, formed as an interchangeable lens for a digital camera.

* * * * *